Figure 1:
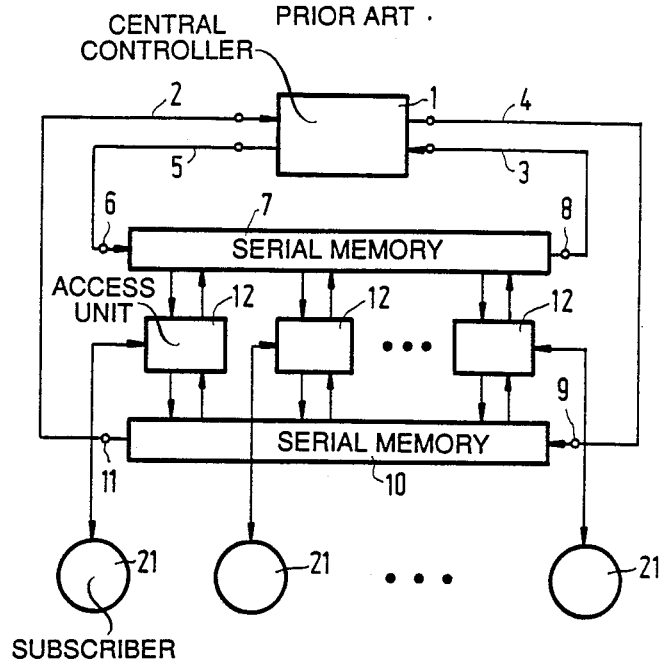

United States Patent [19]

Schreur

[11] Patent Number: 4,953,158
[45] Date of Patent: Aug. 28, 1990

[54] SWITCH SYSTEM FOR CIRCUIT AND/OR PACKET-SWITCHED COMMUNICATIONS

[75] Inventor: Hendrik Schreur, Hilversum, Netherlands

[73] Assignee: AT&T Bell Laboratories, Murray Hill, N.J.

[21] Appl. No.: 338,803

[22] Filed: Apr. 14, 1989

[30] Foreign Application Priority Data

Apr. 21, 1988 [NL] Netherlands ............... 8801033

[51] Int. Cl.⁵ .................................................. H04J 3/02
[52] U.S. Cl. .................................. 370/60.1; 370/58.1; 370/55
[58] Field of Search .................. 370/60, 95, 89, 55, 370/58, 60.1, 58.1

[56] References Cited

U.S. PATENT DOCUMENTS

| | | | |
|---|---|---|---|
| 4,460,994 | 7/1984 | Scanlon et al. | 370/89 |
| 4,503,533 | 3/1985 | Tobagi et al. | 370/89 |
| 4,823,340 | 4/1989 | Grassman | 370/60 |

OTHER PUBLICATIONS

Z. L. Budrikis et al., "A Packet/Circuit Switch", *AT&T Bell Laboratories Technical Journal*, vol. 63, No. 8, Oct. 1984, pp. 1499–1519.

*Primary Examiner*—Douglas W. Olms
*Assistant Examiner*—Min Jung
*Attorney, Agent, or Firm*—Peter Visserman

[57] ABSTRACT

A switch system for circuit and/or packet-switched communications comprising a central controller; a clock signal source; a pair of serial memories and a series of consecutive access units each of which being linked on the one hand with an associated subscriber terminal and on the other with the read and write terminal of an associated memory location of the first as well as the second serial memory, the input and the output of the two serial memories being linked with the central controller and the information stored at the memory locations of the first and the second serial memories permitting to be transferred from the first to the last access unit and from the last to the first access unit, respectively, under control of the clock signals, the central controller generating consecutive patterns with always an equal number of time slots, each containing a predetermined number of clock signal periods in which at least an amount of information bits, each having a first or a second binary value, can be written, and each access unit being arranged for rewriting the information bits in a time slot as bits having the same binary value as before they were rewritten or as bits having the second binary value, the locations of the bits that are rewritten as bits having the second binary value being determined by the access unit. For at least a plurality of access units, means are provided for rewriting information bits in a time slot having the second binary value as bits having a first binary value.

7 Claims, 2 Drawing Sheets

SWITCH SYSTEM FOR CIRCUIT AND/OR PACKET-SWITCHED COMMUNICATIONS

The invention relates to a switch system for circuit and/or packet-switched communications comprising a central controller; a clock signal source; a pair of serial memories and a series of consecutive access units each of which permitting to be linked on the one hand with an associated subscriber terminal and on the other with the read and write terminal of an associated memory location of the first as well as the second serial memory, the input and the output of the two serial memories being linked with the central controller and the information stored at the memory locations of the first and second serial memories permitting to be transferred from the first to the last access unit and from the last to the first access unit, respectively, under control of the clock signals, the central controller generating consecutive frame patterns always having equal numbers of time slots, each containing a predetermined number of clock signal periods in which at least an amount of information bits can be written, and each access unit being arranged for writing new bits into a time slot instead of information bits having a first binary value information, the new bits having a second binary value at locations in this time slot the locations being determined by the access unit.

Such a switch system is known from "A Packet/Circuit Switch" by Z. L. Budrikis and A. N. Netravali in AT&T Bell Laboratories Technical Journal, Vol. 63, No. 8, Oct. 1984, pp. 1499–1519.

The known system is diagrammatically shown in FIG. 1. This Figure shows two serial memories, a central controller and a number of access units. The subscribers are connected to the switch system via the access units. The serial memories are used as communication channels amongst the access units, the one serial memory functioning as forward channel and the other as backward channel.

Figure 2:
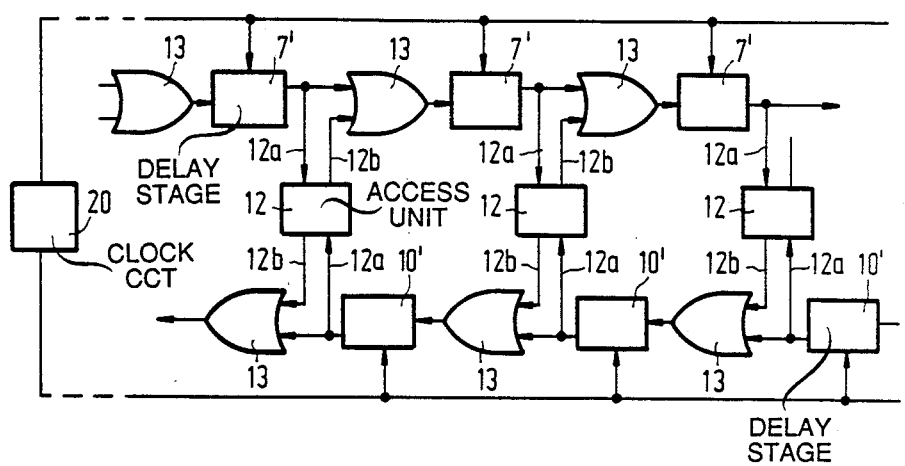

The consecutive access units in the switch system are connected to the read- and write points of consecutive memory locations of the serial memories, each access unit being connected to both serial memories. This appears, more specifically, from FIG. 2, showing a detail of the system as is shown in FIG. 1 in which the serial memories are arranged as shift registers whose consecutive delay stages form the memory locations. Dedicated to each delay stage is an OR-gate, whose first input terminal is linked with the output of the preceding delay stage, which also forms the read connection of the memory location to the dedicated access unit and whose second input terminal forms the write connection of the memory location to that access unit. Each access unit has an address and can reach any other access unit via one of the channels. If an access unit wishes to reach another access unit of higher address than its own address, the forward channel is used. On the other hand, if an access unit wishes to reach another access unit of lower address, the backward channel is used.

Data which can consist of packet-data as well as real-time data for circuit-switched communications, are transferred in time slots having a uniform length and format. Each slot comprises, as shown diagrammatically in FIG. 3, a number of consecutive bit sequences of which the first sequence is determined by a single slot-occupancy bit (BUSY), indicating whether the time slot is accessible or not; the second sequence by a single request bit (RQST), the third 14-bit sequence by the receiver address (RCVR); the fourth 14-bit sequence by the sender address (SNDR), the fifth 24-byte sequence by data to be transferred and, ultimately, the fifth 2-bit sequence by synchronizing bits (SYNC). Thus, a single time slot contains 224 bits.

If data are included in a time slot, the busy bit is equal to one, which means that the slot is engaged. If an access unit is unable to find idle time slots for transferring its data packet via a channel, the unit will set the request bit in an arbitrary slot in the other channel to one.

Figure 3:

The operation of the system shown in FIGS. 1–3 is as follows. If an access unit wants to communicate and transmit, for example, data packets to another access unit of higher address, the forward channel has to be used. The transmitting access unit will first verify the RQSR bit of every time slot in passage through the backward channel to be sure that none of the access units of higher address has a data packet available for transmission through the forward channel. Subsequently, this access unit will verify the busy bit of every time slot in passage through the forward channel until an idle time slot, with a busy bit equal to zero, is found. If the RQST bits in the time slots in the backward channel are equal to zero and an idle time slot is found in the forward channel, meaning that this access unit is permitted to transmit its data packet, this access unit will move the busy bit to one and write the information for RCVR, SNDR and data into the idle time slot in the forward channel. For this purpose, the access unit can exchange through the second input of the associated OR-gate a series of zeroes for ones, which zeroes were offered by the associated delay stage of the shift register at bit positions determined by the access unit. If a time slot in passage through a channel is not accessible to an access unit, whereas the latter does have data packets to be transmitted, this access unit will move the RQSR bit in one of the time slots of the other channel to one. All access units verify the RCVR bits in every passing time slot. If the RCVR bits in a specific time slot correspond with the access unit's own address, this access unit will read out the data in this time slot. Only the access units of higher address than the address of the transmitting access unit can receive through the forward channel.

The same procedure is also followed for the backward channel, through which only access units of lower address than the transmitting access unit can receive.

The real-time or circuit-switched communication in the known system is controlled by the central controller in the switch system. After reception of a request for a real-time communication, the central controller carries out the necessary verifications and decides whether a communication can be established or not established. If a communication is feasible, the central controller transmits the address of the access unit that wishes to transmit to the access unit that has to receive. Subsequently, the central controller marks specific time slots by moving its busy bit to one and writes the sender address (SNDR) of the sending access unit at the bit positions concerned and then sends this time slot through the correct channel at the proper frequency. The sending access unit then writes its data in the time slot, when it detects its own address, and the receiving access unit reads these data when it recognizes the sender address.

For a further detailed description of the known system reference is made to the above article.

The known switch system has a great disadvantage that with data communications the possibility of transmitting data packets is not evenly distributed over all access units. When assuming that the access units of the switch system divide into two groups, one with low-address access units and the other with high-address access units, the latter have more chance of sending data packets through the forward channel than the low-address access units. Conversely, the low-address access units have more chance of sending data packets through the backward channel than the high-address access units. After all, for transmitting data packets through the forward channel the low-address access units can be blocked by the RQST bits, which are continuously transmitted by high-address access units. This could lead to the fact that not a single low-address access unit can write its data in an idle time slot in passage through the forward channel, because the idle time slots are constantly used by the high-address access units, one or a multiplicity of which always transmit(s) RQST bits through the forward channel so as to block the low-address access units. This also happens in the backward channel, in which case, however, the high-address access units can be constantly blocked by the low-address access units.

A further disadvantage, which refers to both data communications and real-time communications, is the fact that a single specific time slot in a pattern, which lasts 3 milliseconds, for example, can be used for communication between a pair of access units only one time. Also if a message has to be transferred between two access units situated very close together, there is no possibility of re-using the same time slot for transferring a message between a pair of access units situated further along the forward or backward channel.

The invention has for its object to improve the known switch system such that its capacity is considerably enlarged, so that for specific access units placed low in the hierarchic order as a result of the order of their addresses the risk of never being able to send is accordingly reduced considerably.

For this purpose, the invention provides a switch system of the abovementioned type in which for at least a plurality of access units means are provided for writing in a time slot also information bits with the first binary value.

The invention is based on the recognition that the messages from a sending access unit to a receiving access unit on average occupy no more than a portion of, in many cases no more than half, the total length of the communication channel, so that the time slot generated for this message remains unused over a portion of the length of the communication channel. Thus, a much more efficient use of the available capacity of the switch system is feasible if a time slot that has already been used for transferring a message between two access units, can be used once more or several times more for transferring messages between one or several pairs of access units which, seen in the direction of message transfer, are situated between the receiving access unit of the first message and the central controller.

In the known system the central controller offers a time slot with zeroes at all bit positions except for the synchronizing bits and, with real-time communications, the busy bit and the sender address bits, at which bit positions having zeros the access units, if so desired, can write ones.

Due to the measures according to the invention the access units can now, if so desired, write zeroes as well. This enables, as will be further explained hereinafter, both for real-time communications and data communications to use a certain time slot in a pattern, during its transfer through the serial memory, for the communication between a multiplicity of pairs of access units.

Figure 4:
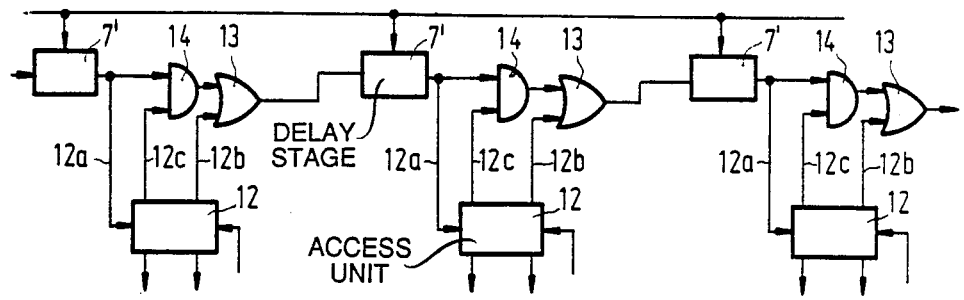
Figure 5:
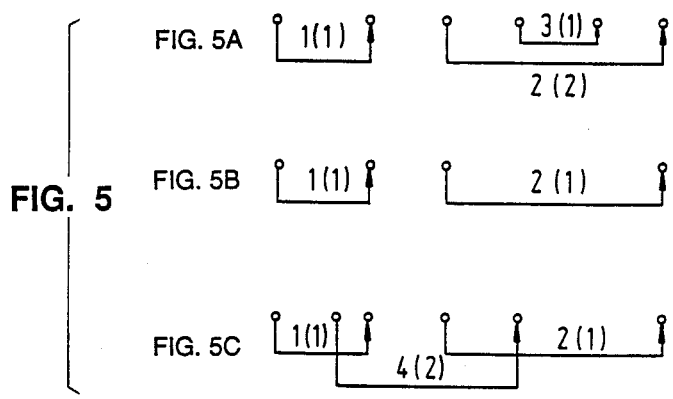
Figure 6:
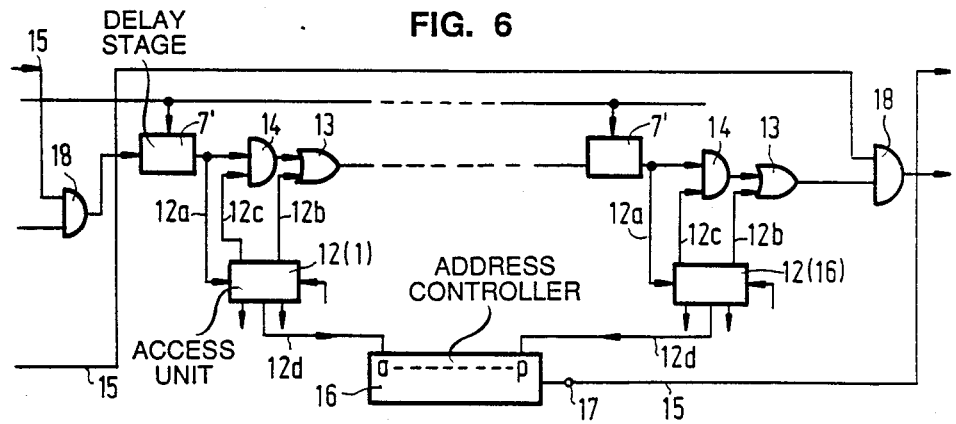

The invention will be further explained hereinafter with reference to two embodiments whilst reference is made to the drawing, in which FIG. 1: shows the known switch system for circuit- and/or packet-switched communications;

FIG. 2: shows more in detail a portion of the communication channel of the system as shown in FIG. 1;

FIG. 3: shows by way of a diagram the position of the various bit sequences in a single time slot;

FIG. 4: shows a first modification of the system as shown in FIG. 1 for real-time communications;

FIGS. 5a through 5c show a diagrammatic example of the rearrangement of time-slots for specified communications; and FIG. 6: shows a second modification of the system as shown in FIG. 1 for data communications.

FIG. 1 shows a switch system for real-time and/or data communications which is known from the abovementioned article by Z. L. Budrikis et al. This system comprises a central controller 1 with a pair of input lines 2 and 3 and a pair of output lines 4 and 5. The output line 5 is connected to the input terminal 6 of a serial memory 7, whose output terminal 8 by means of input line 3 is again connected to the central controller 1. In the same fashion the output line 4 is connected to the input terminal 9 of a second serial memory 10, whose output terminal 11 by means of the input line 2 is again connected to the central controller 1. The respective input and output terminals of access units 12 are connected to the read and write links of each memory position of both the serial memory 7 and the serial memory 10. In this context each access unit 12 is linked with a memory position of serial memory 7 which is situated as many memory positions away from the input of this memory 7 as the memory position of the serial memory 10, with which the same access unit is linked, is situated away from the output of memory 10. Each access unit 12 is used for having a subscriber 21 communicate with the access unit 12 of a further subscriber 21 through one of the two communication channels 7 or 10. The subscribers may consist of telephones, computers, telefax equipment and so on. The entire system as shown in FIG. 1 is controlled by a clock circuit (not shown in FIG. 1.), enabling the whole system to operate synchronously.

Any type of memory described in the abovementioned article can be used for the serial memory, but for simplicity a shift register is preferably used having a plurality of delay stages, which is at least equal to the number of linked access units.

FIG. 2 shows a portion of such a shift register comprising a plurality of delay stages 7' and 10', respectively, controlled by a clock pulse circuit 20, an access unit being connected via its input 12a to the output of each delay stage, the output 12b of each access unit always being connected to the first input terminal of an OR-gate 13, whose second input terminal is connected to the said output of the delay stage.

For the operation of the system as shown in FIG. 1 and FIG. 2 reference is made to what was observed above in this respect.

FIG. 4 shows a first modification of the system according to the invention as shown in FIGS. 1 and 2, for simplicity only the forward channel being shown because the backward channel is realized completely identical, this modification creating the option in real-time communications to use a specific time slot in a specific pattern for communication between a plurality of pairs of access units.

Before presenting a detailed explanation of FIG. 4, the principle of the functioning of the switch system according to the invention for real-time communications will be briefly explained.

As the switch system is a synchronous system, each access unit knows exactly the serial number of every passing time slot. If a connection has to be established for a real-time communication, the central controller 1 according to an aspect of the invention will send messages to the associated access units and inform them of the serial number of the time slot in which they can write their real-time data. Now, if the central controller is requested by a different access unit to establish a different real-time communication between a different pair of access units, and this pair of access units in the associated communication channel seen in the direction of the message transfer, is positioned after the first pair of access units, the central controller can assign the same time slot to both pairs of access units. As the central controller does all the administrative work of the real-time communication processes, the central controller can control these processes by rearranging the serial numbers of the time slots for the pairs that are communicating. This rearranging is effected in the case when slots can be used by two or a plurality of channels in common. Because of this rearrangement, the capacity of the switch system is enlarged. If assuming that the chance of a specific access unit transmitting real-time data to another access unit is determined by a uniform distribution over all access units, each time slot which is used for real-time communications will be used twice on average. This yields an improvement by approximately a factor of two for real-time communications.

FIGS. 5a-c diagrammatically show in what way the central control unit realizes a more efficient utilization of the capacity of the communication channel by rearranging the time slots. In these Figures it is assumed that four communications are established between different pairs of access units, not specified any further. The communications are shown in the Figure by the numbers 1-4, these numbers being followed by parenthesized time slots asigned to each communication.

FIG. 5a shows that in two time slots three communications can be established because communications 1 and 3 can have the same time slot asigned to them according to the basic idea of the invention.

If the communication 3 is terminated, as shown in FIG. 5b, and the central controller receives a request for establishing a communication 4, the central controller first assigns time slot 1 to communication 2 and subsequently, as shown in FIG. 5c, the time slot 2 to communication 4. Without the rearrangement shown in FIG. 5, a third time slot would be required for communication 4, which means an unnecessary load of the channel capacity. It will be evident that FIG. 5 provides only a simple example for clarity and with a very large number of communications and a very large number of time slots the basic idea remains the same.

Another possibility for establishing the real-time communication between two access units is the one with which the central controller informs the access unit wishing to send about the time slot assigned thereto and about the address of the receiving access unit, the sending access unit writing this address in the time slot concerned. This is different from the method implemented in the known switch system, because there the central controller transfers the sender address the receiving access unit. In this case too the central controller can assign the same time slot to a plurality of access units that wish to communicate. In both cases this is realized by the central controller assigning the value one to the busy bit of the time slots intended for real-time communication, which busy bit value is then no longer changed by the access units.

If a specific time slot is used for real-time communications by a plurality of pairs of access units it is necessary, after the data are read out by a receiving access unit, that at any rate the next access unit in the series to which the same time slot has been assigned by the central controller can write in this time slot at the desired bit locations at least the data in the form of zeroes and ones depending on the message to be communicated. In the above example mentioned second the receiver address and also the data have to be written anew.

In order to realize the possibility of writing zeroes as well, according to the invention each access unit comprises an AND-gate 14 in addition to the already available OR-gate 13. Furthermore, each access unit includes in addition to output terminal 12b connected to the first input terminal of the associated OR-gate a second output terminal 12c, which is connected to a first input terminal of the AND-gate 14. The output terminal of the associated delay stage 7' or 10' is connected to the second input terminal of AND-gate 14, the output terminal of the AND-gate 14 being connected to the second input terminal of the OR-gate 13. Naturally, the output terminal of the delay stage is connected as in the known system to the input terminal 12a of the access unit.

The Table represented hereinbelow shows how the circuit according to FIG. 4 around a single access unit operates in dependence on the logic value of the write signals at the output terminals 12b and 12c.

| 12b | 12c | Logic value function |
|-----|-----|------------------------|
| 0 | 1 | unchanged transfer of information |
| 0 | 0 | write zeroes |
| 1 | 0 | write ones |
| 1 | 1 | write ones |

This Table shows that by adding only a second output terminal 12c and a single AND-gate 14 each access unit is able to write zeroes in an offered time slot, due to which already available information in the form of ones can be erased. It will be evident that the above principle can also be applied if the central controller generated time slots with ones at all idle bit positions. It is also evident that the term "one" and "zero" only serve to indicate that binary data transfer is implemented.

FIG. 6 shows a second modification for the switch system as shown in FIGS. 1 and 2, whilst also for data communications in the form a packet-switched traffic a considerable extension of the capacity can be achieved. Also in FIG. 6 only the forward channel is shown for clarity, because the backward channel has an identical structure. The entension of the capacity is achieved by always providing a reset line 15 for the busy bit in a group of access units and an address detection unit 16. This address detection unit has as many inputs as there are access units in a group, each of these inputs being linked with one access unit from the group. Now, if an access unit from the group receives through the serial memory a data packet whose receive address matches its own address, this access unit on an output 12 applies an output control signal to the associated input of the address detection unit 16. The output 17 of the address detection unit is connected to the reset line 15 and receives a reset signal from the address detection unit if one of the access units in the group applies a control signal to the address detection unit. At the end of each group of access units a logic AND-gate 18 is inserted, receiving on the one side the signal from the last delay stage 7' or 10' of the group and the reset signal for the busy bit on line 15 from the preceding group of access units on the other.

If the signal on line 15 is a logic zero, the output signal of the AND-gate 18 is also bound to be a logic zero so that, consequently, the busy bit can be reset to zero.

The reason why always one group of access units comprises an address detection unit is the fact that once an access unit has detected on the basis of the receiver address (the RCVR bits) that a certain message is meant for it, the busy bit, as clearly appears from FIG. 3, which has been put a number of bit positions in advance of the last bit of the received address in the message, has already shifted a number of access units further under control of the clock signal, this number corresponding with the said distance between the two bit positions. In the example described above, in which the busy bit is followed by a single request bit and by a 14-bit receiver address, no less than 16 access units 12(1)–12(16) have to be included in a group to be able to timely reset to zero the busy bit of the time slot concerned through the reset line 15. For that matter the address controller comprises 16 inputs 16a–16b.

By means of an address controller and the reset line the busy bit can be reset in an access unit situated at a distance from the addressed access unit, due to which the time slot concerned is further available for taking in a new data packet.

It will be evident that the measures for real-time communications shown in FIG. 4 can be combined with the measures for data communications shown in FIG. 6, so that a switch system will develop which has a considerably larger capacity than the known system both for circuit-switched communications and packet-switched data communications, without having to make concessions to the speed of the system.

I claim:

1. A switch system for circuit and/or packet-switched communications comprising a central controller; a clock-signal source; a pair of serial memories and a series of consecutive access units each of which permitting to be linked on the one hand with an associated subscriber terminal and on the other with the read and write terminal of an associated memory location of the first as well as the second serial memory, the input and the output of the two serial memories being linked with the central controller and the information stored at the memory locations of the first and second serial memories permitting to be transferred from the first to the last access unit and from the last to the first access unit, respectively, under control of the clock signals, the central controller generating consecutive frame patterns always having equal numbers of time slots, each containing a predetermined number of clock signal periods, in which time slots at least an amount of information bits, each having a first or a second binary value, can be written, and each access unit being arranged for rewriting the information bits in a time slot as bits having the same binary value as before they were rewritten or as bits having the second binary value, the locations of the bits that are rewritten as bits having the second binary value being determined by the access unit, characterized in that for at least a plurality of access units means are provided for rewriting information bits in a time slot having the second binary value as bits having a first binary value.

2. A switch system as claimed in claim 1, in which each serial memory comprises a shift register with a multiplicity of delay stages which is at least equal to the multiplicity of access units connected to the shift register, and in which is provided between each pair of consecutive delay stages a first logic gate with a pair of input terminals, whose first terminal is linked with the output of the preceding delay stage and the second with the output terminal of the associated access unit and whose output is linked with the input of the next delay stage, characterized in that between each pair of delay stages further logic gate means are provided, each having at least two input terminals and an output terminal, the first input terminal being coupled to the preceding delay stage, the second input terminal being coupled to the associated access unit and the output being coupled to the first logic gate.

3. A switch system as claimed in claim 2, with a first binary value being a logic zero and the second binary value being a logic one and the first logic gate being an OR-gate, characterized in that said further logic gate means comprise and AND-gate with a pair of input terminals, the first input terminal being connected to the output of the preceding delay stage and the second to a second output terminal of the associated access unit and whose output terminal is connected to the first input terminal of the OR-gate.

4. A switch system as claimed in one of the claims 1–3, characterized in that in circuit-switched communications the central controller is arranged for setting a busy bit in a specific time slot, a set busy bit having a logic state indicating that this time slot is busy, and for informing both the sending and the receiving access unit about the serial number of this time slot in a pattern.

5. A switch system as claimed in one of the claims 1–3, characterized in that in circuit-switched communications the central controller is arranged for setting a busy bit in a specific time slot, a set busy bit having a state which indicates that this time slot is busy, and for informing the sending access units about the serial number of this time slot in a pattern and about the address of the receiving access unit, and in that the sending access unit is arranged for writing this address into the time slot upon arrival.

6. A switch system as in claimed in claim 1 or 2 characterized in that always a number of access units and memory locations form a group and that for each group is provided an address control unit, a reset line and logic gate means, each access unit in the group being linked with an associated input of the address control unit and arranged for applying a control signal thereto if this access unit detects its own address in a message transmitted in a time slot, the output of the address control unit being linked with the reset line of the next group, which output is arranged for providing a reset signal as soon as one of the inputs receives a control signal from an access unit, the reset line of the preceding group and the output of the last memory location being linked with logic gate means which are arranged for producing a signal having the first binary value of a reset signal is present on the reset line.

7. A switch system as claimed in claim 2, with a first binary value being a logic zero and the second binary value being a logic one and the first logic gate being an OR-gate, characterized in that said further logic gate means comprise an AND-gate with a pair of input terminals, the first input terminal being connected to the output of the preceding delay stage and the second to a second output terminal of the associated access unit and whose output terminal is connected to the first input terminal of the OR-gate, charcterized in that
   always a number of access units and memory locations form a group and that for each group is provided an address control unit, a reset line and logic gate means, each access unit in the group being linked with an associated input of the address control unit and arranged for applying a control signal thereto if this access unit detects its own address in a message transmitted in a time slot, the output of the address control unit being linked with the reset line of the next group, which output is arranged for providing a reset signal as soon as one of the inputs receives a control signal from an access unit, the reset line of the preceding group and the output of the last memory location being linked with logic gate means which are arranged for producing a signal having the first binary value of a reset signal is present on the reset line and further characterized in that the gate means comprise a logic AND-gate and in that the reset signal has for its object to reset a busy bit in a time slot to the first binary value.

* * * * *